United States Patent [19]

Yoshida et al.

[11] Patent Number: 4,485,863

[45] Date of Patent: Dec. 4, 1984

[54] CONTROL DEVICE FOR CAR-MOUNTED AIR-CONDITIONER

[75] Inventors: Yukio Yoshida; Akira Tanaka; Ryutaro Fukumoto; Ryosaku Akimoto; Shigetoshi Tanaka; Nobuaki Ito, all of Nagoya, Japan

[73] Assignees: Mitsubishi Jukogyo Kabushiki Kaisha; Churyo Engineering Co., Ltd.

[21] Appl. No.: 326,590

[22] Filed: Dec. 2, 1981

[30] Foreign Application Priority Data

Dec. 12, 1980 [JP] Japan .................. 55-175307

[51] Int. Cl.³ .............................................. F25B 29/00
[52] U.S. Cl. ........................................ 165/42; 165/13; 236/76
[58] Field of Search ............... 165/40, 42, 13; 62/186, 62/244; 236/13, 76; 98/2.01

[56] References Cited

U.S. PATENT DOCUMENTS

| 2,409,064 | 10/1946 | Parsons ................... 236/76 |
| 2,607,532 | 8/1952 | Lehane .................... 236/68 |
| 3,214,099 | 10/1965 | Capps ..................... 236/9 |
| 3,823,568 | 7/1974 | Bijasiewicz et al. ............. 62/186 |
| 4,259,722 | 3/1981 | Iwata et al. ................ 165/42 |
| 4,289,195 | 9/1981 | Ballott et al. .............. 165/42 |
| 4,337,821 | 7/1982 | Saito ..................... 165/42 X |
| 4,340,112 | 7/1982 | Sutoh et al. ............... 165/42 |
| 4,340,113 | 7/1982 | Iwata et al. ............... 62/244 |
| 4,358,050 | 11/1982 | Naganoma et al. ........... 165/42 |
| 4,364,513 | 12/1982 | Tsuzuki et al. ............. 98/2.01 |
| 4,406,322 | 9/1983 | Rossi et al. ............... 165/42 |

FOREIGN PATENT DOCUMENTS

| EP25592 | 3/1981 | European Pat. Off. ............. 165/42 |
| 51241 | 4/1979 | Japan ..................... 165/40 |
| 51238 | 4/1979 | Japan ..................... 165/40 |
| 1397072 | 6/1975 | United Kingdom ............. 165/43 |
| 2045942 | 11/1980 | United Kingdom ............. 165/40 |
| 2096357 | 10/1982 | United Kingdom ............. 98/2.01 |

Primary Examiner—William R. Cline
Assistant Examiner—Randolph A. Smith
Attorney, Agent, or Firm—Toren, McGeady and Stanger

[57] ABSTRACT

A control device is used in a car-mounted air-conditioner of the air mixing type, in which a portion of the cold air, obtained by passing air through an evaporator, is heated by a heater via an air mixing damper. The control device includes a pulse generator, which is supplied with the outputs of a temperature setting device and of a room temperature sensor both of which are provided in a car in which the air-conditioner is mounted. The control device provides an amplified multi-phase pulse signal, based on deviations of the outputs, to an intermittent driving device responsive for rotating the air mixing damper.

1 Claim, 5 Drawing Figures

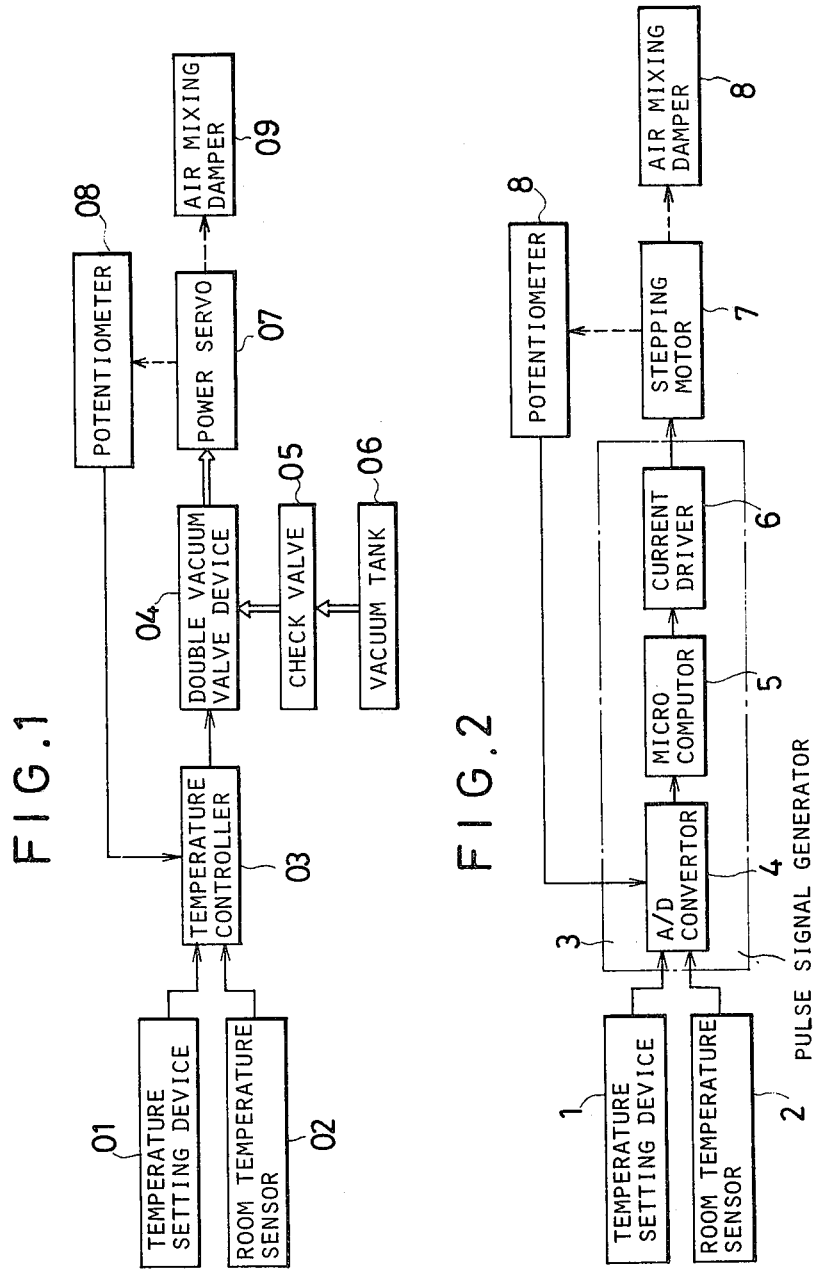

CONTROL DEVICE FOR CAR-MOUNTED AIR-CONDITIONER

BACKGROUND OF THE INVENTION

The present invention relates to a control device for a car-mounted air conditioner.

In the conventional, car-mounted air-conditioner, the room or passenger compartment temperature of a car is controlled by changing the temperature of air blown into the room by directing a portion of the cold air obtained from an evaporator through an air-mixing damper of the vacuum type and passing the portion through a heater. A typical example of such a conventional control device is shown in FIG. 1, in which outputs of a temperature setting device 01 and of a room temperature sensor 02, both of which are mounted on the car, are supplied to a temperature controller 03 where a deviation of the actual temperature from a previously set temperature is obtained. The output of the temperature controller 03 is fed to a double vacuum valve device 04, which is also controlled by a vacuum tank 06 through a check valve 05, to drive a power servo 07 for rotating an air mixing damper 09. The rotation of the damper 09 is fed back through a potentiometer 08 to the temperature controller 03.

The car-mounted air-conditioner of this type is now widely used successfully. It has some inherent defects, however, such as the need for providing a vacuum source and many constitutional components for driving the vacuum source, which cause the system to be expensive and to require a larger spacing for the piping of the vacuum source, and the low resolution of the air mixing damper positioning, i.e., the unavoidable hysteresis in the reciprocation of the damper.

SUMMARY OF THE INVENTION

The present invention is intended to overcome the inherent defects of the conventional control device for the car-mounted air-conditioner and an object of the present invention is to provide a control device for the car-mounted air-conditioner, which is compact, light-weight and inexpensive.

The above object is achieved, according to the present invention, by incorporating a pulse generator which receives outputs of a temperature setting device and a room temperature sensor, obtains a deviation of an actual temperature from a temperature previously set, produces a multi-phase pulse signal according to the deviation and amplifies the signal. An intermittent driving device, responsive to the amplified multi-phase signal, rotates the air-mixing damper in a car-mounted air-conditioner of the air mixing type in which a portion of the cold air, obtained by passing air through an evaporator, is passed through the air-mixing damper and is heated by a heater.

BRIEF DESCRIPTION OF THE DRAWINGS

FIG. 1 is a schematic illustration, in block diagram, of a typical example of a conventional control device for a car-mounted air-conditioner;

FIG. 2 is a block diagram of an embodiment of the control device according to the present invention;

DETAILED DESCRIPTION OF THE EMBODIMENT

Figure 3:
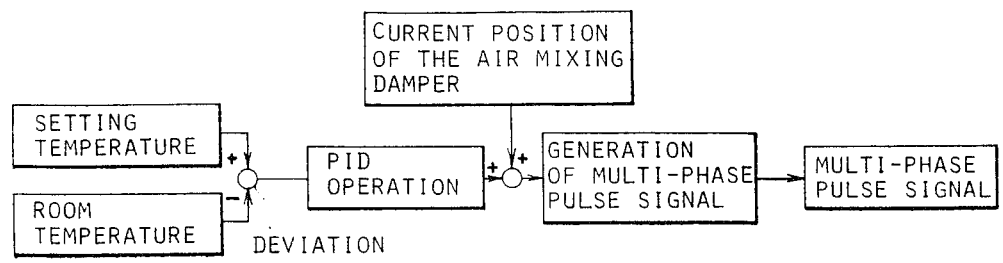
FIG. 3 is a block diagram showing operations to be performed by a microcomputer shown in FIG. 2.

In FIG. 2, the control device for a car-mounted air conditioner comprises a temperature setting device 1 for setting the room temperature to be controlled, a room temperature sensor 2 for detecting the actual room temperature, a pulse signal generator 3 including an A/D converter 4, a microcomputer 5, and a current driver 6, a stepping motor 7 connected to the current driver and serving as an intermittent driving device, a potentiometer 8 connected to the stepping motor for feeding the rotation angle of the stepping motor 7 back to the A/D converter 4, and an air-mixing damper 9 driven intermittently by the stepping motor 7.

With the control device constituted as above, the temperature set by the temperature setting device 1 is converted by the A/D converter 4 into a digital value which is entered in the microcomputer 5. The actual room temperature is detected by the room temperature sensor 2 and is also converted by the A/D converter 4 into a digital value and entered in the microcomputer 5.

In the microcomputer 5, the deviation of the digitalized actual temperature from the digitalized setting temperature is obtained by PID operation (Proportional Integration-Differentiation operation) as shown in FIG. 3 to calculate a necessary displacement of the air-mixing damper 9 from a current position and the number of pulses and the necessary rotational direction to be given to the stepping motor 7 for realizing the necessary displacement and to generate a desired multi-phase pulse signal.

Figure 4:
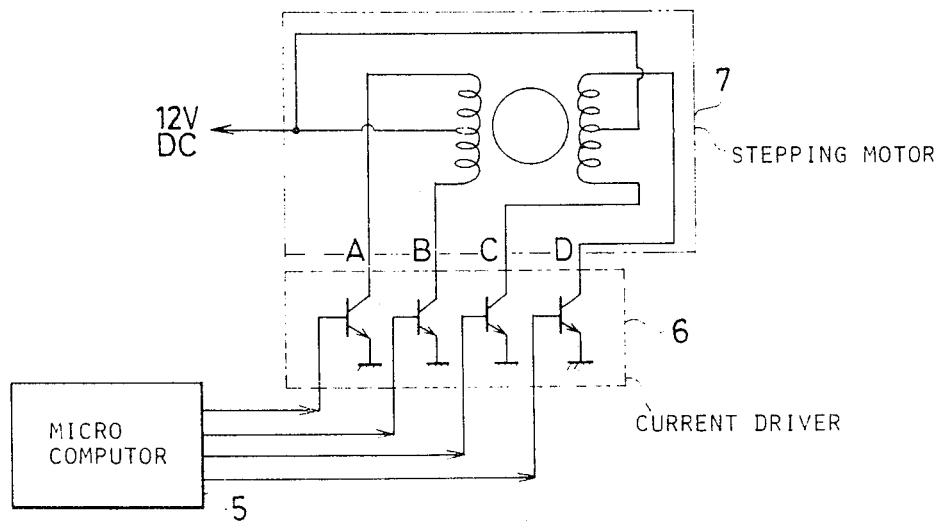
FIG. 4 is a connection of the microcomputer to the stepping motor in FIG. 2.
Figure 5:
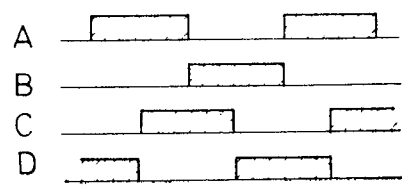
FIG. 5 shows waveforms of the multi-phase pulse signal derived from the current driver.

The stepping motor 7 is in the form of a four-phase, two-pole configuration as shown in FIG. 4, which is referred to as a unipolar driving system having monofilar windings. The four-phase windings A, B, C and D are supplied with pulse current signals A, B, C, D as shown in FIG. 5, respectively, from the microcomputer 5 after being amplified by the current driver 6 so that the stepping motor is driven intermittently thereby.

Although the above mentioned four-phase exciting system is preferable for the stepping motor 7 due to the fact that the attenuation of vibration of the rotor thereof is relatively fast, it may be possible to employ other exciting systems than that set forth above. Further, on demand, it may be possible to change the winding system as well as the number of phases.

Furthermore, although the usual stepping motor is employed to intermittently drive the air-mixing damper in this embodiment, it may be possible to use either an inductor type synchronous motor (so called "timing motor") or a stepping type elecromagnetic solenoid, instead of the stepping motor 7.

The rotational angle of the stepping motor 7 in operation is fed back through the potentiometer 8 to the A/D converter 4 to control the air-mixing damper 9 such that the deviation becomes zero.

Since the desired intermittent displacement of the air-mixing damper 9 can be obtained by supplying a required number of the pulses to the stepping motor 7, it may be possible to omit the potentiometer 8.

With the present control device employing a combination of the microcomputer which is light-weight, compact and inexpensive and the stepping motor, the number of the constitutional components forming the control device is much reduced as compared with the conventional vacuum type system. Therefore, it is possible to realize compactness and weight reduction both of which are requirements for the car-mounted device. Further, since there is no need for the vacuum source and various components associated with it, which cause the cost of the control device to be high, the present invention is superior in economy over the conventional device.

In addition, due to the fact that no vacuum source is used, the present control device can be used even for diesel cars and electric cars in which no vacuum condition is generated. Furthermore, the present control device is superior in durability and in the precise positioning of the air-mixing damper over the conventional system which utilizes a D.C. motor for driving the air-mixing damper.

According to the present invention constituted as mentioned above, the pulse signal generator receives the outputs of the temperature setting device and of the room temperature sensor both of which are mounted on a car having an air-conditioner of the air-mixing type in which a portion of cold air, obtained by passing air through the evaporator, is passed through the air-mixing damper and is heated by the heater. The pulse signal generator calculates the deviation of the actual temperature from the set temperature, and produces a multi-phase pulse signal according to the deviation. The signal is amplified and the intermittent driving device is responsive to the output of the pulse signal generator and drives the air-mixing damper. These components are provided in a combination which is compact, light weight and inexpensive. Therefore, the car-mounted air-conditioner itself becomes compact, light weight and economical which is of considerable advantage in the automobile industry.

We claim:

1. A control device for a car-mounted air-conditioner of the air-mixing type including a first device for setting a temperature for a space and for providing a signal representing the set temperature, and a second device for sensing the actual space temperature and for providing a signal representing the actual space temperature, said air-conditioner including an air-mixing damper for receiving cool air and for selectively directing a portion of the cool air over a heater, said control device including a pulse signal generator arranged to receive the signals of each of said first and second devices and to obtain the deviation of the actual space temperature sensed by said second device from the temperature set by said first device, said pulse signal generator including an A/D converter for converting the signals from said first and second devices into digital signals, a microcomputer connected to said A/D converter for receiving the digital signals and for effecting a PID operation (proportional integration-differentiation operation) and determining the necessary displacement of said air-mixing damper and for transmitting a multi-phase signal based on the necessary displacement, a current driver in communication with said microcomputer for amplifying the multi-phase signals, and a stepping motor controlled by the amplified multi-phase signals and connected to said air-mixing damper for intermittently driving said air-mixing damper, said stepping motor is a four-phase, two-pole type having a unipolar driving system with monofilar windings and a potentiometer connected to said stepping motor and to said A/D converter for providing feedback from said stepping motor to said A/D converter for controlling said air-mixing damper so that the deviation between the set and actual temperatures becomes zero.

* * * * *